(12) United States Patent
Vossen et al.

(10) Patent No.: US 7,333,393 B2
(45) Date of Patent: Feb. 19, 2008

(54) AMPLITUDE CORRECTION FOR SEISMIC RECORDINGS

(75) Inventors: Robbert Van Vossen, JR Utrecht (NL); Andrew Curtis, Edinburgh (GB); Jeannot Trampert, XA Bunnik (NL)

(73) Assignee: Westerngeco L.L.C., Houston, TX (US)

( * ) Notice: Subject to any disclaimer, the term of this patent is extended or adjusted under 35 U.S.C. 154(b) by 170 days.

(21) Appl. No.: 11/287,960

(22) Filed: Nov. 28, 2005

(65) Prior Publication Data
US 2006/0133207 A1    Jun. 22, 2006

(30) Foreign Application Priority Data
Nov. 30, 2004    (GB) .................................. 0426232.5

(51) Int. Cl.
*G01V 1/36* (2006.01)
(52) U.S. Cl. .......................................... 367/47; 367/38
(58) Field of Classification Search .................. 367/38, 367/47
See application file for complete search history.

(56) References Cited

U.S. PATENT DOCUMENTS

| | | | |
|---|---|---|---|
| 4,677,597 A | 6/1987 | Wright | |
| 4,866,679 A * | 9/1989 | Chambers | 367/47 |
| H1693 H | 11/1997 | Thornton et al. | |
| 5,774,417 A | 6/1998 | Corrigan et al. | |
| 6,026,059 A | 2/2000 | Starr | |

OTHER PUBLICATIONS

Karrenbach Multicomponent source equalization SEG International Exposition and 64th Annual Meeting, Oct. 23-28, 1994/Los Angeles, pp. 1449-1452.
Luo et al The application of blind channel identification techniques to prestack seismic deconvolution Proceedings of the IEEE vol. 86, No. 10, Oct. 1998, pp. 2082-2089.
Taner et al Surface consistent corrections Geophysics vol. 46, No. 1, Jan. 1981, pp. 17-22.
Cary et al Four-component surface-consistent deconvolution Geophysics vol. 58, No. 3, Mar. 1993, pp. 383-392.
Cambois et al Surface-consistent deconvolution in the log/Fourier domain Geophysics vol. 57, No. 6, Jun. 1992, pp. 823-840.
Levin Surface-consistent deconvolution Geophysics vol. 54, No. 9, Sep. 1989, pp. 1123-1133.

* cited by examiner

*Primary Examiner*—Ian J. Lobo
(74) *Attorney, Agent, or Firm*—Vincent Loccisano; Steven Gahlings; James McAleenan

(57) ABSTRACT

A new approach is described based on reciprocity for estimating acquisition-related effects, which has several advantages over conventional surface-consistent processing techniques: (i) It can be applied to complete recordings, hence does not require the isolation of primary reflections in the data, (ii) no assumptions are imposed on the subsurface, and (iii) it is applicable to multi-component data. The application of reciprocity requires symmetric data acquisition, i.e. identical source and receiver patterns, identical locations, and the source orientations have to be identical to the receiver components. Besides reciprocity, additional constraints are required to determine the lateral source and receiver amplitude variations fully. Criteria based on minimizing total energy differences between adjacent common source and common receiver gathers, and in common offset panels of the medium response are applied.

20 Claims, 8 Drawing Sheets

AMPLITUDE CORRECTION FOR SEISMIC RECORDINGS

This application claims priority from United Kingdom Patent Application Number 0426232.5, filed Nov. 30, 2004.

This invention relates to a method for correcting the amplitudes of seismic signals to remove acquisition effects.

BACKGROUND OF THE INVENTION

Amplitude anomalies of reflections in seismic recordings have been used for many decades. Initially, the focus was the search for high-intensity seismic reflections, so-called bright spots, in stacked seismic sections. These bright spots could indicate hydrocarbon accumulations, particularly gas. An important development was the introduction of amplitude-versus offset (AVO) interpretation techniques, in which observations of reflection coefficients for different angles of incidence can be used to discriminate different lithologies. This allows the separation of gas- and non-gas-related amplitude anomalies.

Other applications of amplitude interpretation are the detection of oil reservoirs and of porosity in carbonates as described for example by Castagna et al. (Castagna & Backus, 1993, Offset-dependent reflectivity—Theory and practice of AVO analysis, Society of Exploration Geophysicists).

However, before amplitudes can be interpreted in recorded data, they require a compensation or removal of near-surface and acquisition-related effects, such as source strength and receiver coupling variations. These variations influence all common-midpoint (CMP) based processing, since traces with different sources and receivers are combined in a CMP stack. This degrades the quality of the stack and could lead to biased AVO trends, particularly when related to slowly varying near-surface conditions.

For seismic signals recording along more than one directions, so-called multi-component data, it is important to realize that acquisition-related perturbations distort the vector-wavefield characteristics, since coupling has a different effect on horizontal and vertical source and receiver components. This can bias the observed polarization, for example, in determining the polarization direction of the leading split shear wave involves simultaneous rotation of the horizontal source and receiver coordinates to conform to the principal axes of an azimuthally anisotropic medium. This determination can only be achieved after separating the acquisition-related amplitude effects on the different recorded wavefield components from the medium response effects.

Amplitude corrections can be performed using surface-consistent processing techniques as proposed by a variety of prior art documents including Taner & Koehler, 1981, Surface consistent corrections: Geophysics 46, 17-22; Levin, 1989, Surface-consistent deconvolution: Geophysics 54, 1123-1133; Cambois & Stoffa, 1992, Surface-consistent deconvolution in the log/Fourier domain: Geophysics 57, 823-840; and Cary & Lorentz, 1993, Four-component surface-consistent deconvolution: Geophysics 58, 383-392). The existing techniques are applicable to primary reflections which have to be isolated in the data, and common-depth point (CDP) gathering is assumed to be valid. The term "surface-consistent" refers to the following approximations: the source and receiver amplitude terms can be expressed as finite-impulse response filters which do not vary throughout the recording time and are independent of the direction of propagation of the incident wavefield.

SUMMARY OF THE INVENTION

It is an aspect of the present invention to provide a method for estimating lateral source and receiver amplitude variations including the steps of obtaining signals with sources and receivers at essentially identical positions, expressing the signals as a system of linear equations including source related terms, medium related terms and receiver related terms, and determining estimates of the source and receiver amplitude variations using a solution of said system derived under the condition of reciprocity of the medium response.

The invention requires that source and receivers are either physically placed at identical positions during the recording of the signals or can be virtually moved to such position through intra- or extrapolation from physical source or receiver locations.

Application of reciprocity requires symmetric data acquisition. Hence, source and receivers are either physically placed at identical positions during the recording of the signals or can be virtually moved to such position through intra- or extrapolation from physical source or receiver locations.

The system of linear equations used to derive the estimate of the amplitude variation is solved by equating terms which are symmetric in source and receiver positions. The general principle of this symmetry and the conditions which underlie its application are known as such and commonly referred to as the "reciprocity theorem".

Measurements of the wavefield are often obtained using source arrays or pattern, which are groups of closely spaced sources, and receiver arrays or pattern, which are groups of closely spaced receivers. While the theoretical development in the specification below is given for single sensor data, that is, acquiring data using a single source and a single receiver, reciprocity remains exact even when identical source and receiver patterns are used. Estimates for source and receiver effects are then not obtained for the individual sources/receivers, but for the pattern.

As even after applying the reciprocity theorem, the system of linear equations may not be solvable in a stable and coherent form, one or more additional constraints can be applied to narrow the space of possible solutions. Among the preferred constraints used in the present invention are the energy differences between signals recorded at adjacent source and/or receiver positions or gathers of such signals and the variation in common-offset of one or more components of a medium response.

The system of linear equations can be derived for example from a convolutional model that combines terms representative of source signature, receiver response and medium response. In converting such a model into a practically solvable system of equations any of the known transforms based on sets of orthogonal functions or functionals may be used. A particularly preferred transformation is the Fourier transformation. The transformation may be combined with additional computational steps such as using the logarithm operation to change products into sums.

When applied to remove effects caused by the source or receiver amplitude variations, the estimates are preferably used as finite-impulse response filters for the obtained signals. The estimates and the filters based on them are likely to be frequency dependent.

The signals are preferable seismic signals such as pressure or one or multi-component stress, particle displacement, particle velocity or particle acceleration recordings. The signals are also referred to as wavefield. In view of the required reciprocity, multi-component recordings are preferably performed using multi-component sources, i.e., sources which are capable of generating forces in different orientations or modes.

It is seen as an advantage of the present invention that the estimates can be derived from the whole wavefield or seismogram without, for example, being forced to isolate primary events from the recorded wavefield prior to determining the estimates of source and/or receiver amplitude variations. Therefore, the proposed method is essentially a preprocessing step, contrary to the surface-consistent deconvolution techniques, which are applied at a later stage of seismic processing on a selected part of the data.

The invention thus includes an approach that takes full seismic waveforms into account, and which requires no mid-point binning. The approach uses reciprocity of the medium response for evaluating lateral source and receiver amplitude variations. Differences between reciprocal traces are attributed to differences in source strength and receiver coupling. Karrenbach (Karrenbach, 1994, Multicomponent source equalization: 64$^{th}$ Internat. Ann. Mtg., Soc. Expl. Geophys., Expanded Abstracts, 1449-1452) and Luo and Li (Luo and Li, 1998, The application of blind channel identification techniques to prestack seismic data, Proc. IEEE 86, 2082-2089) applied this technique to determine the seismic source wavelets, assuming that there are no lateral variations in receiver coupling. It can be shown that the latter constraint can be relaxed. This method is also suitable for application to multi-component data for which the conventional surface-consistent deconvolution methods often fail because it is more difficult to identify and isolate primary reflections.

These and other features of the invention, preferred embodiments and variants thereof, possible applications and advantages will become appreciated and understood by those skilled in the art from the following detailed description and drawings.

DETAILED DESCRIPTION OF THE INVENTION

Figure 1:
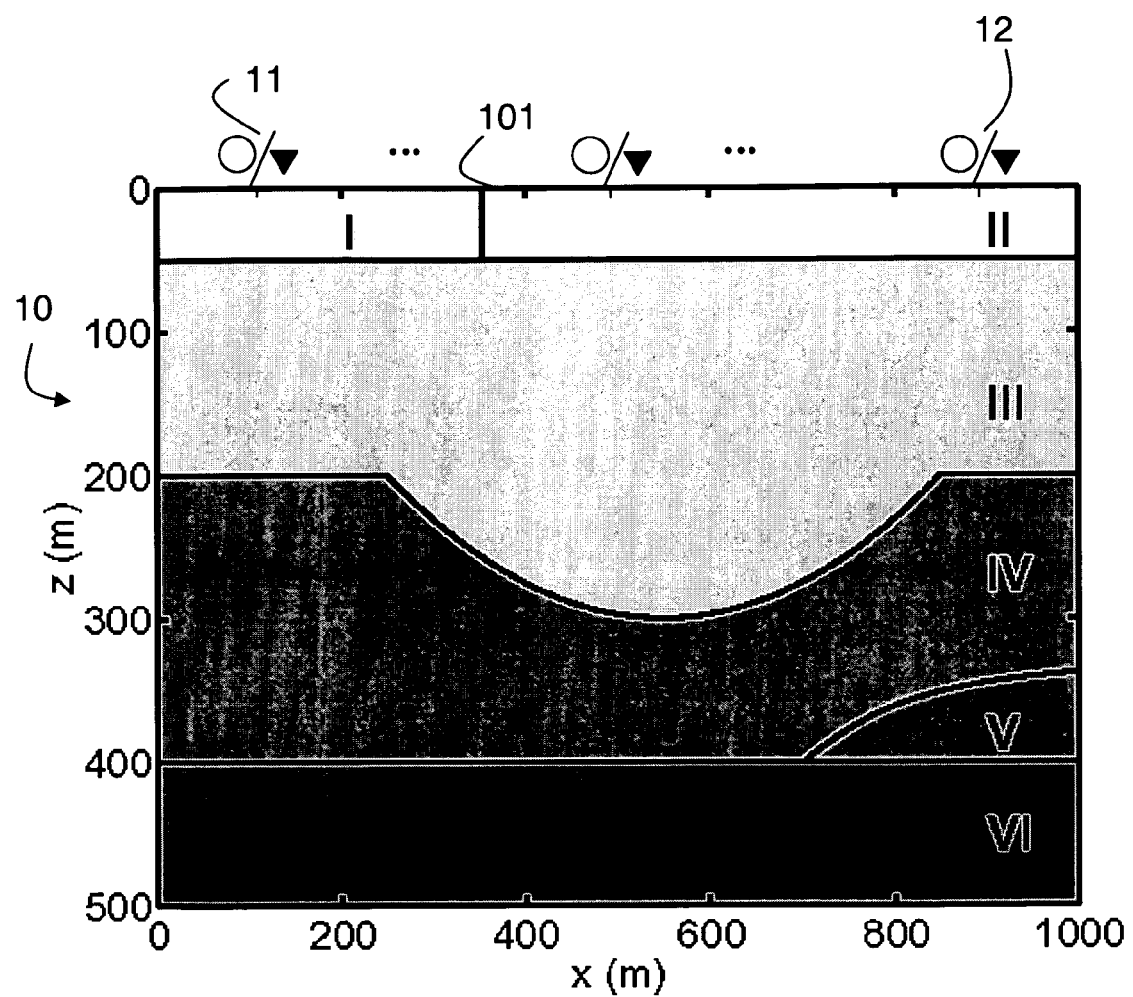
FIG. 1 illustrates the model and source-receiver configuration used in a synthetic example which illustrates a method in accordance with the invention.

It is known as such that multi-component data (3C×3C), excited by a source located at $x_j$ and recorded at location $x_i$ can be represented as a matrix of traces:

$$V(t, i, j) = \begin{pmatrix} V_{xx}(t, i, j) & V_{xy}(t, i, j) & V_{xz}(t, i, j) \\ V_{yx}(t, i, j) & V_{yy}(t, i, j) & V_{yz}(t, i, j) \\ V_{zx}(t, i, j) & V_{zy}(t, i, j) & V_{zz}(t, i, j) \end{pmatrix}, \quad [1]$$

with the top row corresponding to the in-line (x) geophone traces from in-line (x), crossline (y), and vertical (z) sources. The second row contains crossline geophone traces, and the third row vertical geophone traces. The source and receiver positions are located on a line. The indices i and j refer to the receiver and source location numbers, respectively. Considering the earth as a linear system for the propagation of seismic waves, the recorded traces V(t; i; j) satisfy a convolutional model (Zeng & MacBeth, 1993, Algebraic processing techniques for estimating shear-wave splitting in near-offset VSP data: Theory: Geophisical Prospecting 41, 1033-1066), $$V(t,i,j) = R(t,i) * G(t,i,j) * S(t,j), \quad [2]$$

where R(t,i) is the receiver response at surface location $x_i$, S(t,j) is the source signature at surface position $x_j$, and G(t,i,j) is the corresponding medium response. The asterisk (*) denotes convolution in the time domain.

It is assumed that R(t,i) and S(t,j) are surface consistent in the sense defined in the introductory part above. This means that effects associated with a particular source or receiver remain constant throughout the recording time, and affect all wave types similarly, regardless of the direction of propagation. The time dependence in R(t,i) and S(t,j) denotes the length of the finite-impulse response filters. It is further assumed that sources and geophones are perfectly aligned, and that cross-coupling between different source and receiver components can be neglected. Then, the geophone and source responses R(t,i) and S(t,j) are diagonal matrices of time series with the principal components given by the scalar functions of the in-line, cross-line, and vertical geophones and sources.

The objective at this stage is to determine the medium response G(t,i,j), or to remove the influence of lateral source and receiver variations from the recorded data. To achieve this, a determination of the individual components in the convolutional model (equation [2]) is required. The number of unknown parameters can be reduced using reciprocity. Because the medium response is reciprocal, differences between recordings of a reciprocal source/receiver pair can be attributed to lateral differences in source strength and receiver coupling. Reciprocity of the medium response is expressed as:

$$G(t,i,j) = G^T(t,i,j) \quad [3]$$

where $G^T$ is the transpose of G. Reciprocity can only be applied to data if symmetry conditions are satisfied during data acquisition: the source positions should be identical to the receiver positions, and application of reciprocity to multi-component recordings also requires multi-component sources.

The convolutional model and reciprocity result in a system of equations which constrain the individual terms in the convolutional model. A linear inverse problem can be formulated for example in the log/Fourier domain. The log/Fourier transform of a time function X(t) is defined as $$\tilde{X}(t) = \log \int_{-\infty}^{\infty} X(t) e^{-i\omega t} dt \quad [4]$$

and its reverse $$X(t) = \frac{1}{2\Pi} \int_{-\infty}^{\infty} e^{\tilde{X}(\omega) + i\omega t} d\omega. \quad [5]$$

Since convolution in the time domain is equivalent to summation in the log/Fourier domain, the convolutional model becomes in the log/Fourier domain:

$$\tilde{V}(\omega,i,j) = \tilde{R}(\omega,i) + \tilde{G}(\omega,i,j) + \tilde{S}(\omega,j) \quad [5]$$

The real part of equation [6] describes the decomposition of the natural logarithm of the Fourier amplitude spectra into the source, receiver, and medium response terms, whereas the imaginary part of equation [6] gives the decomposition of the phase. In the following, only the amplitude component of the problem is considered.

For the analysis of the system of equations, it is convenient to recast equation [6] in a matrix-vector form:

$$Am(\omega) = d(\omega), \quad [7]$$

where A is the coefficient matrix, $m(\omega)$ contains the unknown parameters in the log/Fourier domain, and the data-vector $d(\omega)$ contains the measurements of the wavefield $\tilde{V}(\omega,i,j)$. The "model" vector $m(\omega)$ is partitioned into the individual components:

$$m(\omega) = \begin{pmatrix} m_G(\omega) \\ m_R(\omega) \\ m_S(\omega) \end{pmatrix}, \quad [8]$$

where $m_G(\omega)$ contains the medium response, $m_R(\omega)$ the receiver terms, and $m_S(\omega)$ the source wavelets. The coefficient matrix A is frequency independent. It only contains ones and zeros.

In this example reciprocity of the medium response is treated as an exact relationship. Instead of inserting the reciprocal equations [3] in the coefficient matrix A, the number of unknown parameters in $m_G(\omega)$ is directly reduced by explicitly substituting the reciprocal medium response terms using equation [3]. Since the number of unknowns is reduced, this approach is computationally favourable.

Furthermore, the above system of equations is solved for relative source and receiver differences. Consequently, a zero-mean constraint can be imposed on the source and receiver terms without loss of generality. Thus, the system of equations [7] only contains the convolutional model equations [6].

To derive a unique solution of the convolutional model equations [6], the above constraints of reciprocity and zero-mean may not be sufficent and further constraints may be required. For example, a single component data with forty-one (N=41) identical source/receiver positions. For N>5, there are more data $N_D = N^2$ than unknown parameters NU= (N+1)N/2+2(n−1):$m_G$ has (N+1)N/2 unknown coefficients, and both $m_R$ and $m_S$ contain N−1 unknown terms. In the example, there are hence 941 unknown parameters. Using singular value decomposition to analyze the constraints on the model parameters. There are N−1 zero singular values, thus N−1 undetermined model parameters. This number corresponds to the number of model parameters in the source or receiver terms. The non-uniqueness is a result of the absence of N reciprocity constraints on zero-offset data. Thus, despite the fact that there are more equations than unknown parameters, the number of independent equations is in many cases insufficient to give a unique solution. Combining the constraints for different frequencies does not provide any additional information to reduce the model null-space, since the coefficient matrix A is frequency independent.

Where no unique solution can be established, additional information is required to obtain a unique solution to the inverse problem. It is proposed to apply regularization using both energy criteria, and minimum variation in common-offset sections of the medium response. Energy criteria give prior information on the source and receiver terms, and the variation criterion provides information about the medium response. Prior information (or the reference model), denoted by $m^0$, is included in the inverse problem defining a cost function:

$$Y = (Am-d)^T C_d^{-1}(Am-d) + (m-m^0)^T C_m^{-1}(m-m^0), \quad [9]$$

where $C_d^{-1}$ is the inverse of the data covariance matrix which is taken to be diagonal, and $C_{m-1}$ is the inverse of the prior model covariance matrix. It is a block-diagonal matrix and can be written in partitioned form:

$$C_m^{-1} = \begin{pmatrix} C_{m_G}^{-1} & 0 & 0 \\ 0 & C_{m_R}^{-1} & 0 \\ 0 & 0 & C_{m_S}^{-1} \end{pmatrix}, \quad [10]$$

where $C_{m_G}$, $C_{m_R}$ and $C_{m_S}$ are the covariance matrices describing prior information on the medium response, receiver, and source terms, respectively. The least squares solution of equation [9] is found by setting the derivatives with respect to the model parameters equal to zero, and is given by (see for example Tarantola, 1987, Inverse problem theory, Elsevier):

$$\tilde{m} = (A^T C_d^{-1} A + C_m^{-1})^{-1}(A^T C_d^{-1} d + C_m^{-1} m^0). \quad [11]$$

The model resolution matrix is then:

$$R = (A^T C_d^{-1} A + C_m^{-1})^{-1} A^T C_d^{-1} A. \quad [12]$$

The resolution operator indicates to what extent the chosen model parameters can be retrieved independently from the inverse operator. The total number of independent parameters used to construct the estimated model is given by the trace of the resolution matrix.

An alternative approach is to add information only to the null-space of the unregularized inversion. The procedure of adding null-space information while retaining the data fit was originally proposed by Deal and Nolet (Deal and Nolet, 1996: Nullspace shuttles, Geophys. J. Int. 124, 372-380) for tomographic inverse problems. This approach, though feasible, is less flexible in dealing with data contaminated by noise, and therefore the below presented results are implemented using regularization criteria shown in equation [11].

In the following sections it is demonstrated that prior information given by a minimum variation criterion and energy criteria can be incorporated in the conventional formalism, i.e. expressions are derived for the prior model and for the prior model covariances for the proposed regularization criteria. The derivations are given for single component data, but are readily generalized for multicomponent data.

Prior information on the medium response can be obtained by requiring that variation in the common-offset for an individual component of the medium response is small. The underlying idea is that lateral source and receiver variations result in amplitude variations in common-offset sections. If these lateral source and receiver variations are correctly retrieved and the recorded data are corrected for these source and receiver effects, the amplitude variations in the common-offset sections of the medium response are reduced to the minimum required by the data. Herein variation in the common-offset medium response is defined using a measure of length:

$$L(x_o) = [m_G(x_o) - \mu_G(x_o)]^T [m_G(x_o) - \mu_G(x_o)] \quad [13]$$
$$= [A_l(x_o)m_G(x_o)]^T [A_l(x_o)m_G(x_o)],$$

where $m_G(x_o)$ denotes the partition of $m_G$ with offset $x_o$, and the elements of $m_G(x_o)$ are the average of $m_G(x_o)$:

$$[\mu_G(x_o)]_j = \frac{\sum_{i=1}^{N(x_o)} [m_G(x_o)]_i}{N(x_o)}, \quad j = 1, \ldots, N(x_o), \quad [14]$$

with $N(x_o)$ the number of traces with offset $x_o$. The matrix $A_l(x_o)$ is the coefficient matrix, and is defined such that $A_l(x_o)m_G(x_0)=m_G(x_o)-m_G(x_o)$.

The minimum variation cost function L is defined by combining all common-offset sections, using the number of traces in each common-offset section as weights, i.e. this criterion provides more reliable information using common-offset sections with many traces, since the mean and variation with respect to this mean can be determined more accurately. The cost function is given by:

$$L = \sum_{x_o} N(x_o)L(x_o) = [A_1 m_G]^T W_m [A_1 m_G(w).] \quad [15]$$

The coefficient matrix $A_l$ comprises all individual matrices $A_l(x_o)$, and the diagonal matrix $W_m$ contains the corresponding weighting factors $N(x_0)$ and is normalized such that the maximum value of $$\max [A_1^T W_m A_1] = \frac{2}{N+1}. \quad [16]$$

This maximum is set equal to the ratio of the number of unknowns in $m_R$ or $m_S$ over $m_G$. This normalization has been chosen to reduce the dependency of the damping parameters on the number of sources/receivers.

The minimum variation criterion can be included in the inverse problem (equations [9]), with the inverse of the medium-response model covariance given by:

$$C_{m_G}^{-1} = \theta A_l^T W_m A_l, \quad [17]$$

where $\theta$ is the overall damping parameter. The prior medium response is set to $$m_G^0 = 0. \quad [18]$$

The choice of the prior medium response does not influence the inversion.

The energy criteria is now derived for a common source gather for a source positioned at $x_j$ with N receivers. The energy for frequency $\omega$ in this gather is proportional to the squared sum of all traces:

$$E(\omega, j) = \sum_{i=1}^{N} |\nu(\omega, i, j)|^2. \quad [19]$$

Inserting the convolutional model (equation [2]) into equations [19] yields:

$$E(\omega, j) = |S(\omega, j)|^2 \left( \sum_{i=1}^{N} |R(\omega, i)|^2 |G(\omega, i, j)|^2 \right). \quad [20]$$

The energy in the common-source gather for the adjacent source position, with geophones positioned at similar offsets, is given by:

$$E(\omega, j+1) = |S(\omega, j+1)|^2 \left( \sum_{i=1}^{N} |R(\omega, i+1)|^2 |G(\omega, i+1, j+1)|^2 \right). \quad [21]$$

For closely spaced sources, differences in the medium response can be assumed to only occur close to these sources. Consequently, energy differences between two adjacent common source gathers are primarily due to differences at the source. This leads to the following approximation for the energy difference between two adjacent common source gathers:

$$E(\omega, j+1) - E(\omega, j) \approx [|S(\omega, j+1)|^2 - |S(\omega, j)|^2] \times \quad [22]$$
$$\frac{1}{2} \left\{ \sum_{i=1}^{N} |R(\omega, i)|^2 |G(\omega, i, j)|^2 + |R(\omega, i+1)|^2 |G(\omega, i+1, j+1)|^2 \right\}.$$

The last term in equation [22] is the average of the medium response and the receiver terms of the two adjacent common source gathers (equations [20] and [21]). It is assumed that this accurately represents the medium and receiver responses for both sources.

Using a similar approximation for $E(\omega,j+1)+E(\omega,j)$, yields for the division of the energy difference by its sum:

$$\frac{E(\omega, j+1) - E(\omega, j)}{E(\omega, j+1) + E(\omega, j)} \approx \frac{|S(\omega, j+1)|^2 - |S(\omega, j)|^2}{|S(\omega, j+1)|^2 + |S(\omega, j)|^2}. \quad [23]$$

Equation [23] is equivalent to $$|S(\omega, j+1)|^2 - \frac{E(\omega, j+1)}{E(\omega, j)} |S(\omega, j)|^2 = 0. \quad [24]$$

Expressions in the log/Fourier domain are obtained by taking the natural logarithm of equation [24]:

$$\overline{S}(\omega, j+1) - \overline{S}(\omega, j) = \frac{1}{2}\log\left[\frac{E(\omega, j+1)}{E(\omega, j)}\right], \quad [25]$$

where the energy term on the right of equation [25] is calculated from the data alone. Hence, this equation imposes additional data-derived constraints on the source terms S. Imposing a zero-mean constraint on the source terms results in an artificial absolute scale on the Green's functions. Equation [25] can be written in matrix-vector form:

$$A_0 m_S^0(\omega) = d_S^0(\omega), \quad [26]$$

where $m_S^0(w)$ contains the prior source variations, $d_S^0(w)$ is the data vector, and $A_0$ is the coefficient matrix. The prior model estimate for $m_S^0$ is obtained using the least-squares solution of equation [26].

A similar analysis can be performed in the common-receiver domain. This results in the following system of equations for the prior receiver terms:

$$\overline{R}(\omega, i+1) - \overline{R}(\omega, i) = \frac{1}{2}\log\left[\frac{E(\omega, i+1)}{E(\omega, i)}\right]. \quad [27]$$

Equation [27] in matrix-vector form is written as:

$$A_0 m_R^0(w) = d_R^0(w), \quad [28]$$

where $m_R^0(w)$ contains the prior receiver model parameters, and $d_R^0(w)$ is the data vector.

The following covariance matrices $C_{m_R}$ and $C_{m_S}$ are used to impose the energy criteria upon the model vector.

$$C_{m_R}^{-1} = \frac{2\theta\Phi\lambda A_0^T A_0}{\max[A_0^T A_0]}, \quad [29]$$

$$C_{m_S}^{-1} = \frac{2\theta\Phi(1-\lambda)A_0^T A_0}{\max[A_0^T A_0]}, \quad [30]$$

where $\theta$ is the overall damping parameter, The smaller the value of $\theta$, the more the model parameters are allowed to vary around the energy and minimum variation constraints, and the better the data can be explained. The parameter $\phi$ determines the strength of the energy criteria relative to the variation criterion, and $\lambda$ controls the relative strength of the energy criteria applied in the common-source domain compared to the common-receiver domain, and may take values between 0 and 1. The denominator in equation [29] and [30] is used to reduce the dependency of the damping parameters $\phi$ and $\lambda$ on the number of sources/receivers considered in the inverse problem.

The inversion results are described in the following using a synthetic example of a section of earth 10 with in internal structure as shown in FIG. 1. Synthetic data were computed with a viscoelastic finite-difference code. The first source and receiver 11 are positioned at 100 m, the last ones 12 at 900 m. The shot and receiver spacing is 20 m: there are 41 source and receiver positions. Both sources and receivers as indicated by circles and solid triangles, respectively, are located at the free surface 101. The source mechanism is a vertical force source, which emits a Ricker wavelet with a 40 Hz central frequency. The time sampling interval is 0.001 s, and a trace has 4000 samples.

At the receiver side, data are perturbed using a damped harmonic oscillator model. This model represents both the response of the geophone-ground coupling, and of the instrument response. A damped harmonic oscillator model is also used to represent the coupling of the source (vertical vibrator) to the ground.

It is important to note that the damped-oscillator description is only used for the source and receiver perturbations in the synthetic examples. The inversion method does not use any constraints that follow from this model, and is thus independent from the damped-oscillator parameterization.

To gain an idea of the influence of the above defined parameter $\phi$ and $\lambda$ on the model estimate, the cost function of equation [9] is minimized many times, systematically varying the parameters $\phi$ and $\lambda$. Errors are added to the data drawn from a Gaussian distribution with a standard deviation $s_d$=0.10 in the log/Fourier domain. This corresponds to errors with a standard deviation of 10 per cent of the values of the synthetic data in the frequency domain. The experiments are repeated with different manifestations of random noise. The experiments include using different resonant frequencies and damping parameters for the source and receiver perturbations, and plot the reduced $X^2$ as a function of independent parameters in the final model. The reduced $X^2$ is defined as:

$$X^2 = \frac{1}{N_D - M}(Am - d)^T C_d^{-1}(Am - d), \quad [31]$$

where $N_D$ is the number of data and M=trace (R). Furthermore, the estimated model is compared to the true solution $m_{true}$. The model mismatch can be quantified as $$\xi^2 = \frac{(\tilde{m} - m_{true})^T(\tilde{m} - m_{true})}{N_U}, \quad [32]$$

where $N_U$ is the number of unknown parameters. The measure $\xi$ has been chosen such that it can be interpreted as an average uncertainty in the estimated model parameters.

Figure 2A:
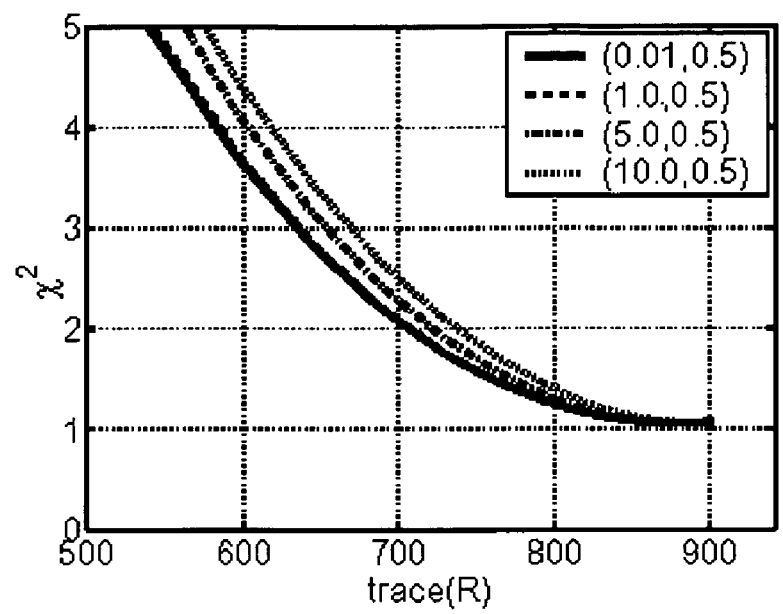
FIG. 2 shows misfit curves for the data (FIG. 2a) and model (FIG. 2b) uncertainty for f=50 Hz using the example of FIG. 1.
Figure 2B:
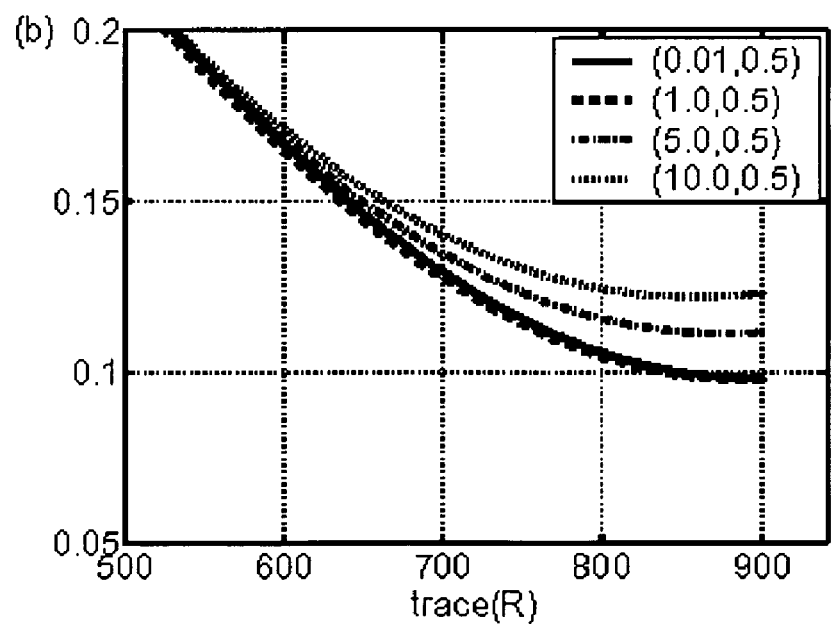

FIG. 2 shows misfit curves for the data and model uncertainty for f=50 Hz. These misfit curves are computed varying the overall damping parameter $\theta$, and consequently the trace of R using equation [12]. The data are better explained reducing the overall damping $\theta$, i.e. allowing more independent parameters in the inversion, resulting in small values for $X^2$. As the overall damping is reduced, $X^2$ monotonically tends towards 1, as expected. As FIG. 2 shows, both the data and the model misfit measures indicate that best results are obtained if $\phi \leq 1$. For a fixed value of traceR, the data are better explained for $\phi \leq 1$. For larger values, both the data and model misfit increase. The explanation for this is that the source and receiver terms are better constrained by the data than the individual medium response terms, i.e. all equations in a common-source gather constrain the individual source term, whereas there is only one equation for a particular Green's function. Thus, imposing prior information on the source and receiver terms potentially has a larger influence on data and model misfit than prior information on the medium response terms. Sensitivity tests for $\lambda$, the trade-off parameter between source and receiver terms, indicated that the inversion results are not influenced by variations in this parameter.

An example of the inversion for lateral source and receiver perturbations is shown in FIG. 3. The frequency f=50 Hz, and the damping parameter values are θ=0.001, φ=0.01 and λ=0.5, resulting in trace(R)≈901. Inversion results are shown for unperturbed data, and for data contaminated with Gaussian noise with standard deviation 0.10. In order to quantify the error, the measure $\xi_{R,S}$ is used for the source and receiver amplitude terms:

$$\xi_{R,S}^2 = \frac{(\tilde{m}_R - m_{Rtrue})^T(\tilde{m}_R - m_{Rtrue}) + (\tilde{m}_S - m_{Strue})^T(\tilde{m}_S - m_{Strue})}{2N} \qquad [33]$$

Figure 3A:
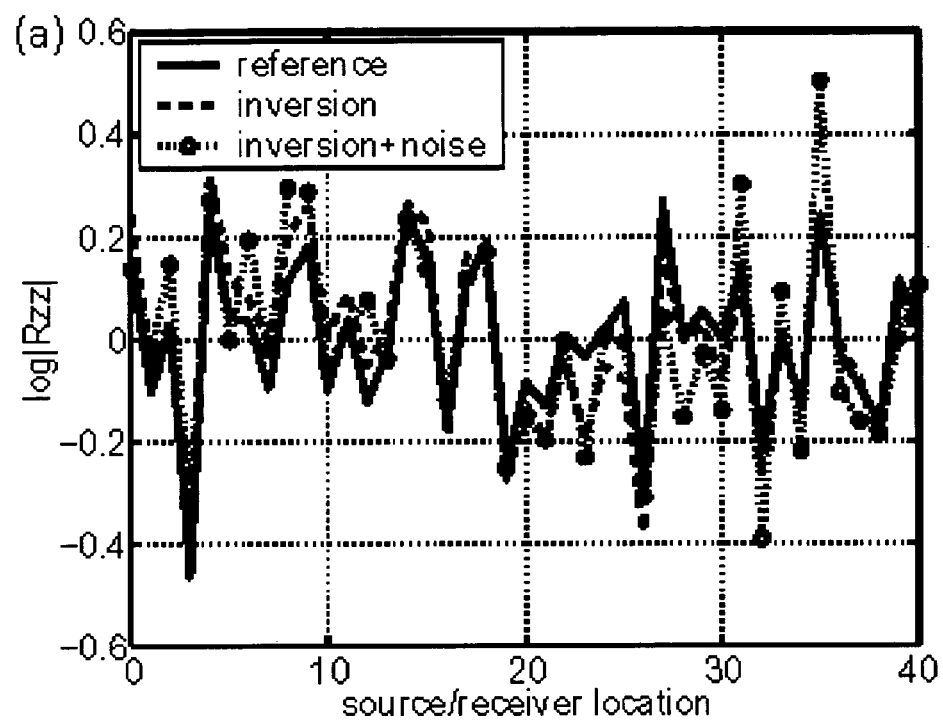
FIG. 3 show inversion results for relative receiver (FIG. 3a) and source perturbation (FIG. 3b) for unperturbed data, and for data contaminated with Gaussian noise with standard deviation 0.10 using a method in accordance with the present invention.
Figure 3B:
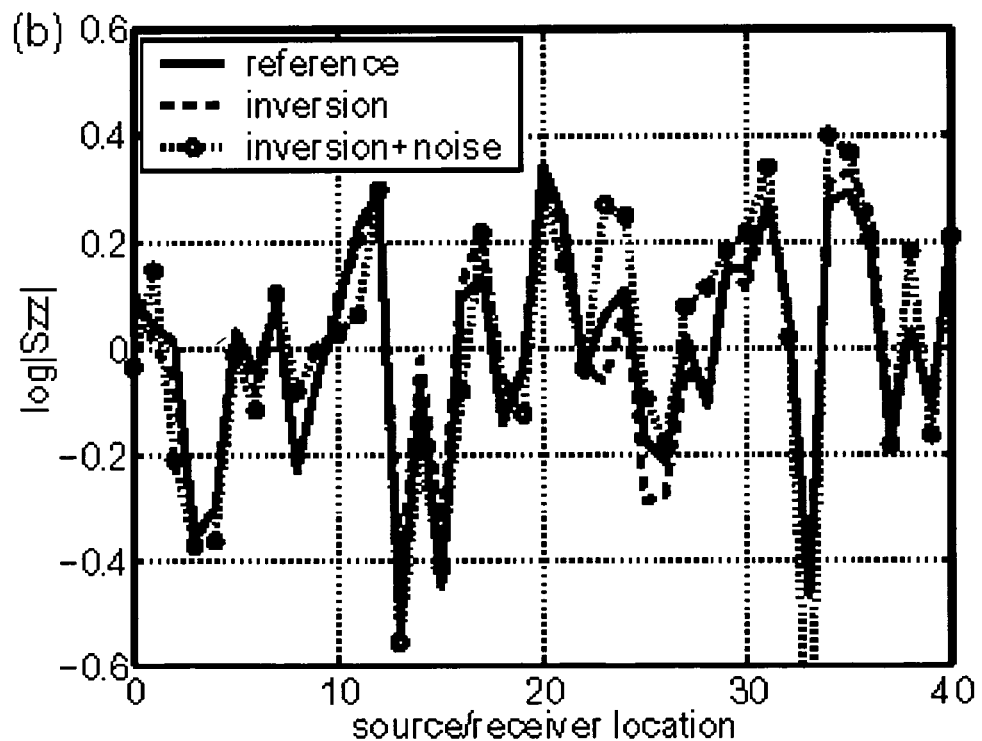

For the unperturbed data, there is a good fit to the reference solution which is the true solution for the lateral source and receiver amplitude variations: $\xi_{R,S}$=0.083 For the data contaminated with Gaussian noise with standard deviation 0.10, the fit is slightly less good: $\xi_{R,S}$=0.098. In FIG. 3a the ordinate value Rzz represents the vertical component of the receiver correction and Szz in FIG. 3b represents the vertical component of the source correction.

Instead of using directly the inversion results for the medium response terms $m_G$, the lateral source and receiver terms are used to compensate the recorded data for these effects. This approach is favoured since it allows the implementation of the additional requirement that the source and receiver terms have a finite impulse response, which was not imposed explicitly in the above implementation.

Figure 4:
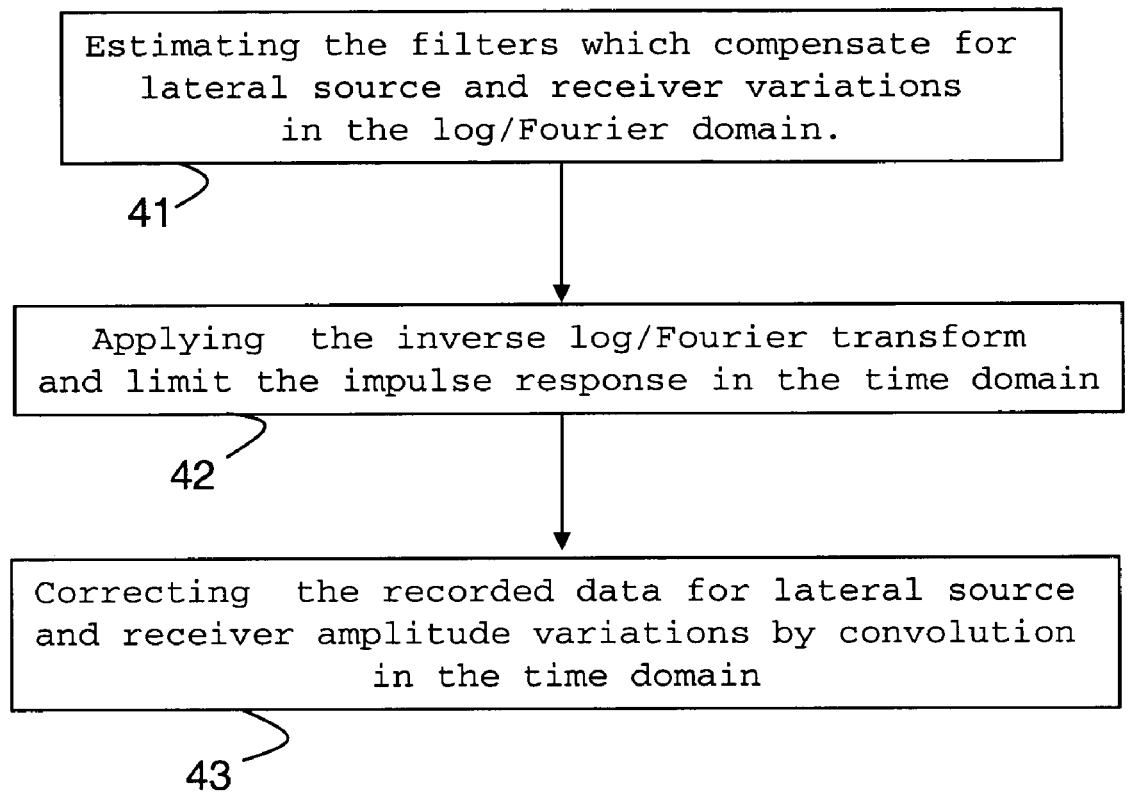
FIG. 4 is a block diagram illustrating steps of a method in accordance with the present invention.

Thus, the compensation scheme consist of the following steps as shown in FIG. 4:

estimating the filters which compensate for lateral source and receiver variations in the log/Fourier domain. These inverse filters are obtained by reversing the sign in the log/Fourier domain (step 41);

applying the inverse log/Fourier transform and limit the impulse response in the time domain. This operation is performed such that the resulting filters are zero phase, and the filter length for the correction filters was set to 0.03 s. A short filter will result in frequency-independent amplitude corrections (similar for each frequency). Longer filters allow variations in the imposed source and receiver corrections as a function of frequency (step 42); and correcting the recorded data for lateral source and receiver amplitude variations by convolution in the time domain (step 43).

Figure 5:
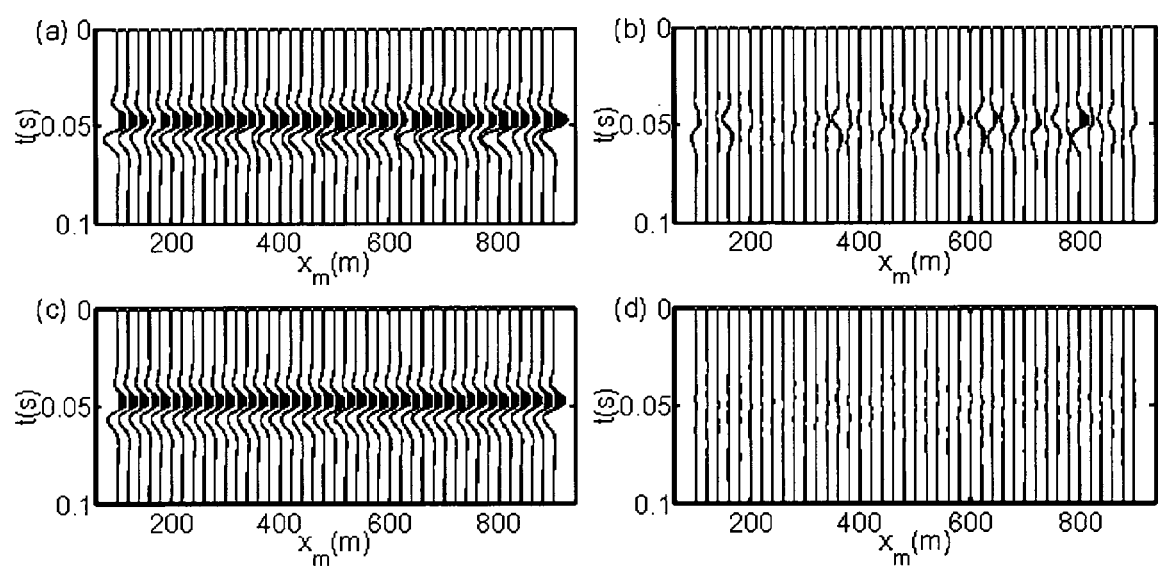
FIG. 5 compares results gained by applying the method of FIG. 4 to correct the amplitude of first arrival (ground roll) data at zero offset with results gained without using the method.
Figure 6:
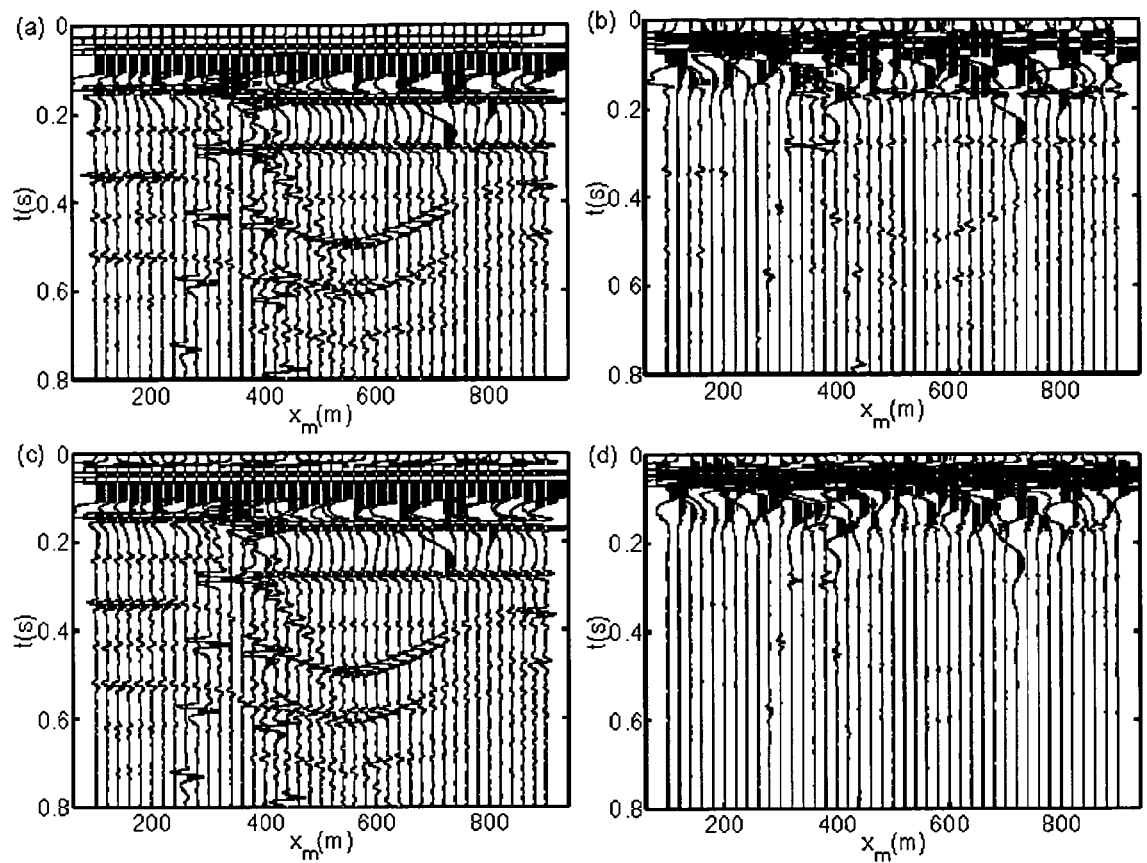
FIG. 6 compares results gained by applying the method of FIG. 4 to correct the amplitude of reflected seismic data at zero offset with results gained without using the method.

The performance of this compensation scheme is illustrated on the synthetic data described in the previous section. Added errors are drawn from a Gaussian distribution with a standard deviation of 10 per cent of the values of the synthetic data in the time domain, followed by a low-pass filter with 100 Hz cut-off frequency, and use the same values of the damping parameters as in the previous example. FIGS. 5 and 6 show the results on the recorded zero-offset data. FIG. 5 shows the results of the first arrival. The amplitudes in FIG. 6 are enlarged to focus on the reflected waves.

The results are compared to a reference solution which includes the phase shifts induced by the lateral source and receiver variations and the average source and receiver terms. Thus, the reference solution is the input data which are compensated for the lateral source and receiver amplitude variations, and do not contain the additional Gaussian errors. The phase differences are included in the reference solution to be able to demonstrate the performance of the amplitude correction scheme. Otherwise, differences would be obtained between the compensated data and the reference solution due to the phase differences for which no compensation is made.

Both for the first arrival and for the reflected waves, the differences of the corrected solution with the reference solution are significantly smaller than for the perturbed data. The large errors in the first 0.2 seconds of FIG. 6d correspond to the residue shown in FIG. 5d.

Figure 7:
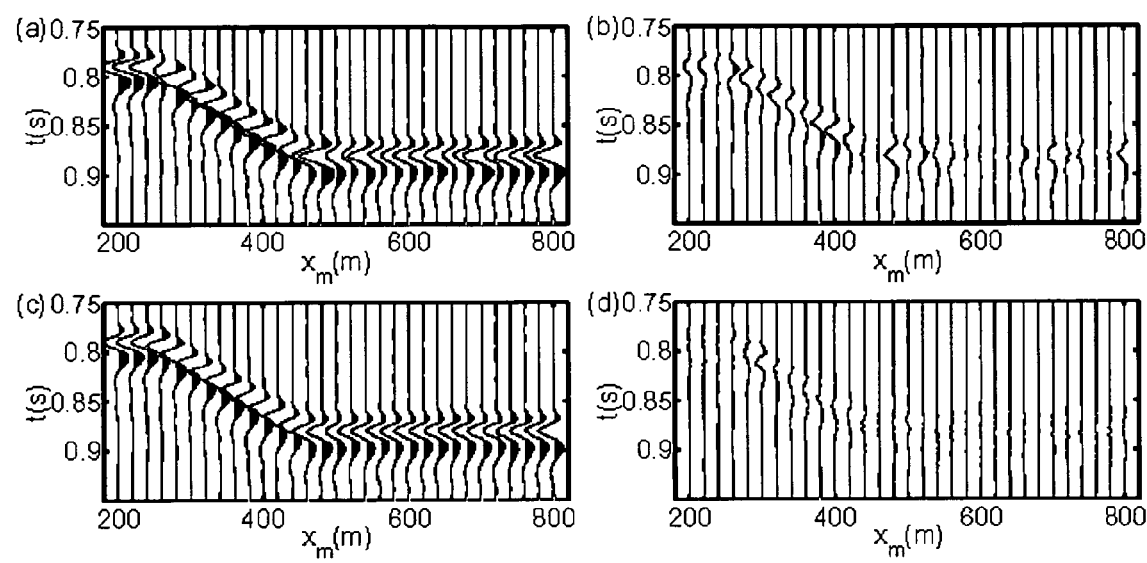
FIG. 7 compares results gained by applying the method of FIG. 4 to correct the amplitude of first arrival (ground roll) data at 200 m offset with results gained without using the method.
Figure 8:
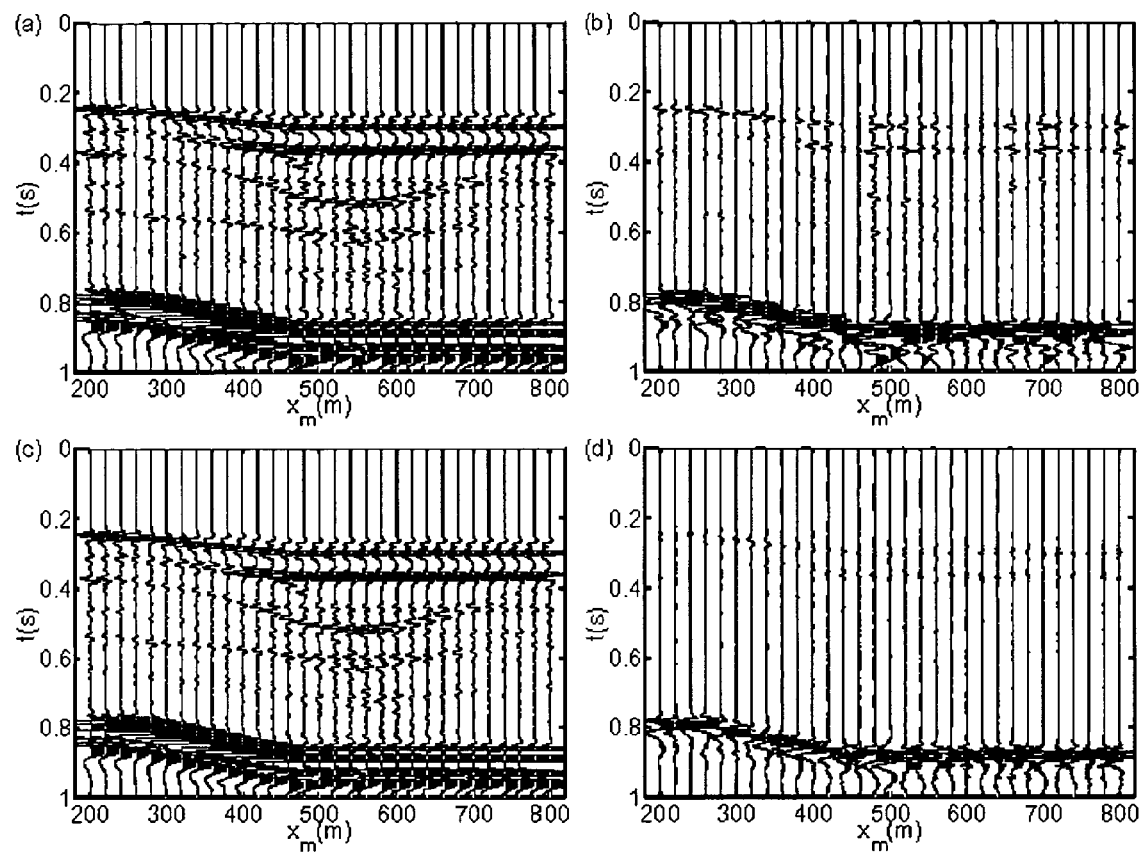
FIG. 8 compares results gained by applying the method of FIG. 4 to correct the amplitude of reflected seismic data at 200 m offset with results gained without using the method.

Similar results are obtained for amplitude corrections for 200 m offset data with FIG. 7 showing the ground roll signal and FIG. 8 showing reflected signals. Amplitude errors in both the ground roll and the reflected waves are reduced.

A comparison of the energy differences with the reference solution before and after the amplitude corrections shows that the errors are significantly reduced. In the noise-free case, the relative energy difference $(E-E_{ref})/E_{ref}$, where E is the energy of all data traces before or after the amplitude corrections and $E_{ref}$ is the energy of the reference solution, decreases from 0.079 to 0.0065. For data perturbed with the random noise (Gaussian noise; standard deviation 10 per cent of the values of the synthetic data), the relative energy differences before and after the amplitude corrections are 0.086 and 0.011, respectively.

This synthetic example demonstrates that the proposed technique significantly reduces effects of lateral source and receiver variations from the data, without having to select primary reflections and without prior structural information.

The invention claimed is:

1. A method for estimating lateral source and/or receiver amplitude variations comprising the steps of:
    obtaining signals with sources and receivers at essentially identical positions;
    expressing the signals as a system of linear equations including source related terms, medium related terms and receiver related terms; and
    determining estimates of the source and/or receiver amplitude variations using a solution of said system derived under the condition of reciprocity of the medium response.

2. The method of claim 1, wherein a range of the estimates is constrained by energy differences between signals recorded at adjacent source and/or receiver positions or gathers of such signals.

3. The method of claim 2, wherein a range of the estimates is constrained by energy differences between adjacent common source and/or common receiver gathers.

4. The method of claim 1, wherein a range of the estimates is constrained by minimizing variation in common-offset between two or more components of a medium response.

5. The method of claim 1, wherein a range of the estimates is constrained by energy differences between signals recorded at adjacent source and/or receiver positions or gathers of such signals and by minimizing variation in common-offset between two or more components of a medium response.

6. The method of claim 1, wherein substantially identical source and receiver locations are obtained by interpolation or extrapolation of recorded signals from non-identically-located sources and receivers to substantially identical source and receiver locations.

7. The method of claim 1, wherein the system of linear equations includes terms representative of source signature, receiver response and medium response.

8. The method of claim 1, wherein the system of linear equations is derived from a convolutional model using a transformation.

9. The method of claim 8, wherein the system of linear equations is derived using a linear system of equations representing a log/Fourier transform of the convolutional model.

10. The method of claim 1, wherein the estimates of the source and/or receiver amplitude variations are applied as finite-impulse response filters for the obtained signals.

11. The method of claim 1, wherein the estimates of the source and/or receiver amplitude variations are frequency dependent.

12. The method of claim 1, wherein the estimates of the source and/or receiver amplitude variations include lateral variations.

13. The method of claim 1, wherein the estimates of the source and/or receiver amplitude variations are determined using seismic signals comprising multiples.

14. The method of claim 1, using a shot pattern and/or a receiver pattern to obtain the signals.

15. The method of claim 1, wherein the signals include pressure.

16. The method of claim 1, wherein the signals include a component of a stress, particle displacement, particle velocity or particle acceleration.

17. The method of claim 1, wherein the signals include multi-component recordings of stress, particle displacement particle velocity or particle acceleration.

18. The method of claim 1, wherein the sources are multi-component sources.

19. The method of claim 1 further comprising the steps of
estimating the filters which compensate for lateral source and receiver variations
limiting the impulse response of the filter in the time domain; and
correcting the obtained signals for lateral source and receiver amplitude variations by convolution in the time domain.

20. The method of claim 19 applied as pre-processing steps prior to any data-reduction steps such as migration andlor inversion.

* * * * *